(12) United States Patent
Malet et al.

(10) Patent No.: US 7,718,740 B2
(45) Date of Patent: May 18, 2010

(54) MIXTURES BASED ON THERMOPLASTIC ELASTOMERS

(75) Inventors: Frederic Malet, Rouen (FR); Thibaut Montanari, Menneval (FR); Christophe Lacroix, Mareil sur Mauldre (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 11/911,219

(22) PCT Filed: Apr. 12, 2006

(86) PCT No.: PCT/FR2006/000803

§ 371 (c)(1),
(2), (4) Date: Oct. 11, 2007

(87) PCT Pub. No.: WO2006/108959

PCT Pub. Date: Oct. 19, 2006

(65) Prior Publication Data

US 2008/0182945 A1    Jul. 31, 2008

Related U.S. Application Data

(60) Provisional application No. 60/703,488, filed on Jul. 28, 2005.

(30) Foreign Application Priority Data

Apr. 14, 2005  (FR) .................................. 05 03713

(51) Int. Cl.
*C08L 77/00* (2006.01)
(52) U.S. Cl. ...................................... 525/432; 525/430
(58) Field of Classification Search ................. 525/430, 525/432
See application file for complete search history.

(56) References Cited

U.S. PATENT DOCUMENTS

| 4,473,688 | A | 9/1984 | Zappa et al. |
| 5,900,471 | A | 5/1999 | Glans |
| 2003/3065107 | | 4/2003 | Lacroix et al. |

FOREIGN PATENT DOCUMENTS

| EP | 0476963 | 9/1991 |
| EP | 0560630 | 3/1993 |
| JP | 62161854 | 7/1987 |

*Primary Examiner*—Ana L Woodward
(74) *Attorney, Agent, or Firm*—Thomas F. Roland

(57) ABSTRACT

The invention relates to a mixture comprising by weight, to give a total of 100%, 99-10% a polyamide block and polyether block copolymer (A) predominately consisting of lauryl lactam radicals, 1-99% at least on type of polymer (B) selected from polyamides other than polyamide 12, copolyamides which do not consist of the lauryl lactam radicals and the polyamide block and polyether block copolymers whose polyamide blocks do not predominantly consist of the lauryl lactam radicals. The articles, for example, films, foils, strings and tubes made from the inventive mixture are also disclosed.

6 Claims, 1 Drawing Sheet

MIXTURES BASED ON THERMOPLASTIC ELASTOMERS

This application claims benefit, under U.S.C. §119 or §365 of French Application Number FR05.03713, filed Apr. 14, 2005; U.S. Provisional Application 60/703,488, filed Jul. 28, 2005; and PCT/FR2006/000803 filed Apr. 12, 2006.

Polyamide block and polyether block copolymers are also called polyether-block-amides (PEBAs), these are thermoplastic elastomers. They are also called polyamide elastomers. The invention relates to blends of polyamide block and polyether block copolymers which have polyamide blocks predominantly composed of lauryl lactam residues with a polyamide other than a PA-12 polyamide or another polyamide block and polyether block copolymer that has polyamide blocks which are not predominantly composed of lauryl lactam residues. The term "residue" refers to the structure of the monomer after polycondensation. These copolymers do not comprise ionic functional groups. They are used for manufacturing numerous articles and in particular sports shoes.

Many patent applications describe polyamide block and polyether block copolymers.

U.S. Pat. No. 4,820,796 describes polyamide block and polyether block copolymers of which the polyamide blocks are made from PA-6 (nylon-6 or polycaprolactam) and the polyether blocks are made from PTMG (polytetramethylene glycol or polyoxytetramethylene glycol or else polytetrahydrofuran) having a number-average molecular weight $\overline{M_n}$ between 680 and 4040. They have insufficient transparency.

U.S. Pat. No. 5,280,087 describes polyamide block and polyether block copolymers of which the polyamide blocks are made from PA-6 (nylon-6 or polycaprolactam) and the polyether blocks are made from PTMG (polytetramethylene glycol or polyoxytetramethylene glycol or else polytetrahydrofuran) having a number-average molecular weight $\overline{M_n}$ between 1000 and 2000. They have insufficient transparency.

Patent Application JP 05 078477 A published on 30 Mar. 1993 describes polyamide block and polyether block copolymers that have blocks made of copolyamide but the polyether blocks are a blend of PTMG and PEG (polyethylene glycol or polyoxyethylene glycol) containing between 30 and 99% by weight of PEG. The number-average molecular weight $\overline{M_n}$ of PTMG is between 1000 and 2000. The number-average molecular weight $\overline{M_n}$ of the PEG is between 1000 and 2020. They are used to make resins antistatic. It is also stated that they have excellent water vapor permeability properties.

Patent Application WO 04 037898 describes transparent polyamide block and polyether block copolymers in which:
the polyether blocks are mainly composed of PTMG having a number-average molecular weight $\overline{M_n}$ between 200 and 4000 g/mol;
the polyamide blocks are composed of a linear (non-cyclic, unbranched) aliphatic semi-crystalline majority monomer and of a sufficient amount of at least one comonomer to decrease their crystallinity while remaining immiscible with the amorphous polyether blocks; and
the Shore D hardness is between 20 and 70.

The transparency is defined as being an opacity less than 12% for a sample of at least 2 mm in thickness.

It has now been found that it is possible to improve the properties of polyamide block and polyether block copolymers which have polyamide blocks predominantly composed of lauryl lactam residues by blending them with a polyamide other than a PA-12 polyamide or another polyamide block and polyether block copolymer having polyamide blocks which are not predominantly composed of lauryl lactam residues. In particular, the optical properties are improved.

The present invention relates to a blend comprising, by weight, the total being 100%:
99 to 10% of a polyamide block and polyether block copolymer (A) that has polyamide blocks predominantly composed of lauryl lactam residues, and 1 to 90% of at least one polymer (B) chosen from:
polyamides other than PA-12 polyamides;
copolyamides which are not predominantly composed of lauryl lactam residues; and
polyamide block and polyether block copolymers that have polyamide blocks which are not predominantly composed of lauryl lactam residues;
said copolymer (A) and said polymer (B) not comprising an ionic functional group.

According to one embodiment of the blend, (B) is transparent.

According to one embodiment of the blend, (B) is PA-11.

According to one embodiment of the blend, (B) is chosen from copolyamides predominantly composed of 11-amino undecanoic acid residues.

According to one embodiment of the blend, (B) is chosen from polyamide block and polyether block copolymers of which the polyamide blocks are made from PA-11 or copolyamides predominantly composed of 11-amino undecanoic acid.

According to one embodiment of the blend, the proportion of (B) is from 5 to 40% per 95 to 60% respectively of (A).

According to one embodiment of the blend, the proportion of (B) is from 10 to 35% per 90 to 65% respectively of (A).

The invention also relates to articles manufactured with this blend. These are, for example, films, sheets, plates, rods, tubes.

Figure 1:
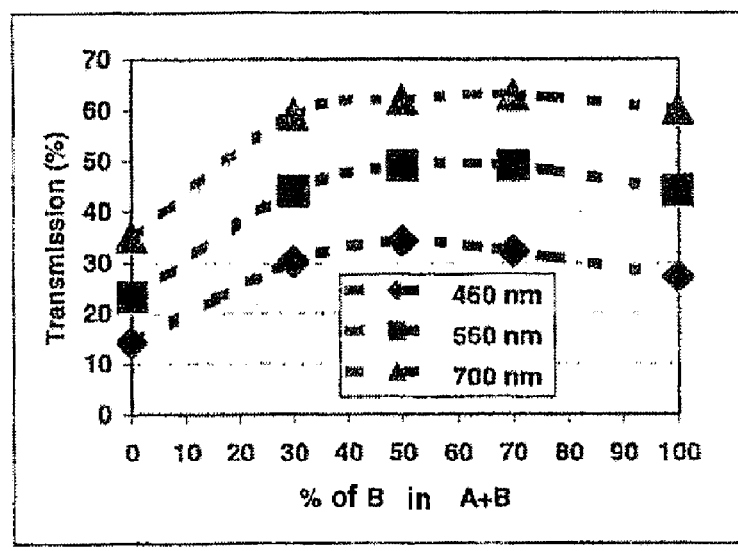
FIG. 1: Diagrams the light transmittance at several wavelengths, based on varying block copolymer compositions.

The polyamide block and polyether block copolymers (A) result from the copolycondensation of polyamide blocks having reactive ends with polyether blocks having reactive ends, such as, amongst others:

1) polyamide blocks having diamine chain ends with polyoxyalkylene blocks having dicarboxylic chain ends;
2) polyamide blocks having dicarboxylic chain ends with polyoxyalkylene blocks having diamine chain ends obtained by cyanoethylation and hydrogenation of aliphatic α,ω-dihydroxylated polyoxyalkylene blocks known as polyether diols; and
3) polyamide blocks having dicarboxylic chain ends with polyether diols, the products obtained being, in this particular case, polyetheresteramides. The copolymers of the invention are advantageously of this type.

The polyamide blocks having dicarboxylic chain ends come, for example, from the condensation of polyamide precursors in the presence of a dicarboxylic acid chain stopper.

The polyamide blocks having diamine chain ends come, for example, from the condensation of polyamide precursors in the presence of a diamine chain stopper.

The polyamide block and polyether block polymers may also comprise units distributed randomly. These polymers may be prepared by the simultaneous reaction of the polyether and of the precursors of the polyamide blocks.

For example, it is possible to react polyether diol, polyamide precursors and a diacid chain stopper. A polymer is obtained having mainly polyether blocks, polyamide blocks of very variable length, but also the various reagents having reacted randomly which are distributed randomly (statistically) along the polymer chain.

It is also possible to react polyetherdiamine, polyamide precursors and a diacid chain stopper. A polymer is obtained having mainly polyether blocks, polyamide blocks of very variable length, but also the various reagents having reacted randomly which are distributed randomly (statistically) along the polymer chain.

The polyamide blocks of (A) are mainly composed of lauryl lactam residues. That is to say that they comprise at least 50.5% by weight of lauryl lactam residues, advantageously at least 55% and preferably 60%. They may also be composed solely of lauryl lactam residues. This proportion is expressed relative to the residues of monomers forming the polyamide blocks but does not comprise the chain stopper. The other optional constituents of the polyamide block may be another lactam such as caprolactam or oenantholactam or an aliphatic α,ω-aminocarboxylic acid such as 7-aminoheptanoic acid and 11-aminoundecanoic acid. The other constituents of the polyamide block may also be an equimolar mixture of a diacid and a diamine. The other optional constituents of the polyamide block may also be another lactam or an aliphatic α,ω-aminocarboxylic acid that does not have 12 carbon atoms and an equimolar mixture of a diacid and a diamine.

As an example of aliphatic diamines, mention may be made of hexamethylenediamine, dodecamethylenediamine and trimethylhexamethylenediamine.

As an example of cycloaliphatic diacids, mention may be made of 1,4-cyclohexyldicarboxylic acid.

As an example of aliphatic diacids, mention may be made of butanedioic, adipic, azelaic, suberic, sebacic and dodecanedicarboxylic acids, dimerized fatty acids (these dimerized fatty acids preferably have a dimer content of at least 98%; preferably they are hydrogenated; they are sold under the trademark PRIPOL by Unichema, or under the trademark EMPOL by Henkel) and polyoxyalkylene α,ω-diacids.

As an example of aromatic diacids, mention may be made of terephthalic (T) and isophthalic (I) acids.

The cycloaliphatic diamines may be isomers of bis(4-aminocyclohexyl)methane (BACM), bis(3-methyl-4-aminocyclohexyl)methane (BMACM), and 2-2-bis(3-methyl-4-aminocyclohexyl)propane (BMACP), and paraaminodicyclohexylmethane (PACM). The other diamines commonly used may be isophorone diamine (IPDA), 2,6-bis(aminomethyl)norbornane (BAMN) and piperazine.

The polyether blocks represent 5 to 49.5%, advantageously from 10 to 30%, even more advantageously from 10 to 25% by weight of the polyamide and polyether block copolymer. The polyether blocks are composed of alkylene oxide units. These units may be, for example, ethylene oxide units, propylene oxide units, trimethylene ether units or tetrahydrofuran (which leads to polytetramethylene glycol linkages). Thus, use is made of PEG blocks, that is to say those composed of ethylene oxide units, PPG blocks, that is to say those composed of propylene oxide units, and PTMG blocks, that is to say those composed of tetramethylene glycol units, also known as polytetrahydrofuran. Mention may also be made of block or random copolyethers. The amount of polyether blocks in these polyamide block and polyether block copolymers is advantageously from 10 to 70% by weight of the copolymer and preferably from 35 to 60%.

The polyether diol blocks are either used as is and copolycondensed with polyamide blocks having carboxylic ends, or they are aminated in order to be converted to polyetherdiamines and condensed with polyamide blocks having carboxylic ends. They may also be mixed with polyamide precursors and a diacid chain stopper in order to make polyamide block and polyether block polymers having randomly distributed units.

The number-average molecular weight $\overline{M_n}$ of the polyamide blocks may be between 500 and 10 000 and preferably between 500 and 4000. The weight $\overline{M_n}$ of the polyether blocks may be between 100 and 6000 and preferably between 200 and 3000.

These polyamide block and polyether block polymers, when they come from the copolycondensation of polyamide and polyether blocks prepared previously or from a single-step reaction have, for example, an intrinsic viscosity between 0.8 and 2.5 measured in meta-cresol at 25° C. for an initial concentration of 0.8 g/100 ml. Such copolymers with polytrimethylene ether blocks are described in U.S. Pat. No. 6,590,065. The preparation of copolymers (A) is described in the prior art.

The rigid polyamide blocks are in the majority, in weight percent, in the polyamide block and polyether block copolymer. The flexible polyether blocks are in the minority, in weight percent, in the polyamide block and polyether block copolymer.

Regarding the polymer (B), it is chosen from:
polyamides other than PA-12 polyamides;
copolyamides which are not predominantly composed of lauryl lactam residues; and
polyamide block and polyether block copolymers that have polyamide blocks which are not predominantly composed of lauryl lactam residues, the rigid polyamide blocks being in the majority, in weight percent, in the polyamide block and polyether block copolymer, the flexible polyether blocks being in the minority, in weight percent, in the polyamide block and polyether block copolymer.

Advantageously, from the above products, those which are the most transparent are chosen.

Among the polyamides other than the PA-12 polyamides, mention may be made, by way of example, of PA-6, PA-6,6, PA-6,9, PA-6,10, PA-6,12, PA-6,18 and PA-11.

Regarding the copolyamides which are not predominantly composed of lauryl lactam residues, mention may be made of PA-6/12 with a majority of PA-6, PA-6/6,6, PA-6/11, PA-6/11/6,6, and copolyamides predominantly composed of aminoundecanoic acid residues (PA-11).

Regarding the polyamide block and polyether block copolymers that have polyamide blocks which are not predominantly composed of lauryl lactam residues, these are, for example, copolymers such as (A) but the polyamide blocks are polyamides other than PA-12 polyamides or copolyamides which are not predominantly composed of lauryl lactam residues. As an example of such polyamide or copolyamide blocks of the polyamide block and polyether block copolymer (B), mention may be made of polyamides other than PA-12 polyamides and copolyamides which are not predominantly composed of lauryl lactam residues that were mentioned above.

The polyether blocks represent 5 to 49.5%, advantageously from 10 to 30%, even more advantageously from 10 to 25% by weight of the polyamide and polyether block copolymer.

Regarding the proportions of (A) and (B), the proportion of (B) is advantageously from 5 to 40% per 95 to 60% respectively of (A). Preferably the proportion of (B) is from 10 to 35% per 90 to 65% respectively of (A). Blending of (A) and (B) may be carried out in the melt state in the normal equipment used for thermoplastics. The blend of the invention may comprise the customary additives for polyamides.

As product (A) a copolymer having PA-12 blocks of $\overline{M}_n$=5000 and PTMG blocks of $\overline{M}_n$=650 was used. The inherent viscosity of this copolymer was between 1.33 and 1.48, the Shore D hardness was 70.

As product (B) a copolymer having PA-11 blocks of $\overline{M}_n$=5000 and PTMG blocks of $\overline{M}_n$=650 was used. The inherent viscosity of this copolymer was between 1.33 and 1.48, the Shore D hardness was 70.

The light transmission and opacity were measured on 100× 100×2 mm³ sheets.

The opacity (expressed in %) is the ratio of the reflectance of the material placed on a black support to the reflectance of the material placed on a white support. The results are given in Table 1 below.

TABLE 1

| Product [wt % of product] | Transmission | | | Opacity % |
|---|---|---|---|---|
| | 460 nm | 560 nm | 700 nm | |
| A[100] | 14 | 23 | 35 | 25.1 |
| A[70] + B[30] | 30 | 44 | 59 | 21.1 |
| A[50] + B[50] | 34 | 49 | 62 | 21.4 |
| A[30] + B[70] | 32 | 49 | 63 | 24.9 |
| B[100] | 27 | 44 | 60 | 26.3 |

The transparency of the copolymers of the present invention was measured on sheets having a thickness of 2 to 4 mm.

Figure 2:
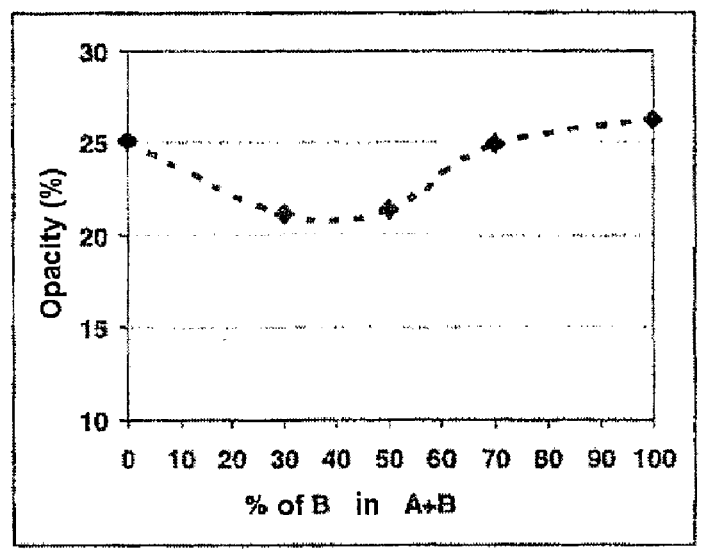
FIG. 2: Diagrams the opacity at several wavelengths, based on varying block copolymer compositions.

The transmission and opacity are represented in the following FIGS. 1 and 2.

The invention claimed is:

1. Blend containing by weight, the total weight being 100%:
  a) 99 to 10% of a copolymer (A) made of polyether blocks and polyamide blocks mostly constituted of repeating units resulting from the lauryllactam polycondensation, wherein said copolymer comprises 5 to 49.5 percent by weight of said polyether blocks; and
  b) 1 to 90% of at least a polymer (B) chosen from:
    1) the polyamides that are not polyamide 12,
    3) the copolymers having polyamide blocks and polyether blocks where the polyamide blocks are not mostly constituted of repeating units resulting from the lauryllactam polycondensation,
  wherein said blend has a higher light transmission and lower opacity than either copolymer (A) or polymer (B) alone.

2. Blend according to claim 1 in which (B) is transparent.

3. Blend according to claim 1 in which (B) is chosen from copolymers having polyamide blocks and polyether blocks where the polyamide blocks are PA 11 or copolyamides mostly constituted of aminoundecanoic acid.

4. Blend according to claim 1 where the proportion of (B) is 5 to 40% against respectively 95 to 60% of (A).

5. Blend according to claim 4 where the proportion of (B) is 10 to 35% against respectively 90 to 65% of (A).

6. Objects made with a blend described in claim 1.

* * * * *